W. A. HAGER.
CHAIN.
APPLICATION FILED JAN. 25, 1918.
1,305,897.
Patented June 3, 1919.
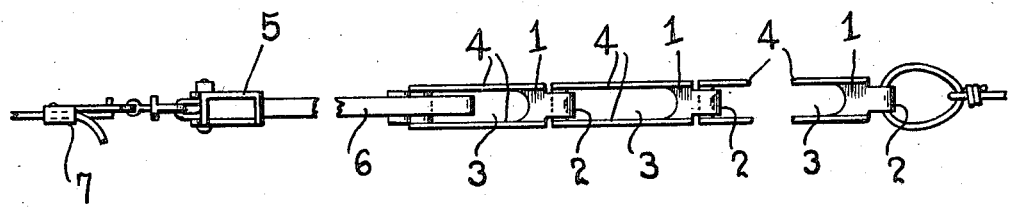
Fig. 1.
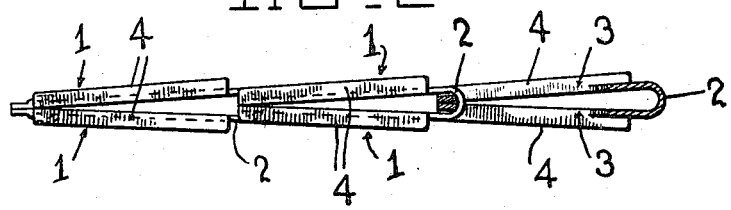
Fig. 2.
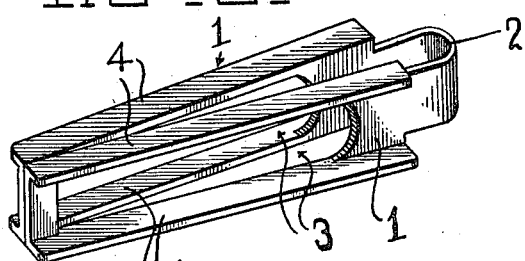
Fig. 3.
Fig. 4.
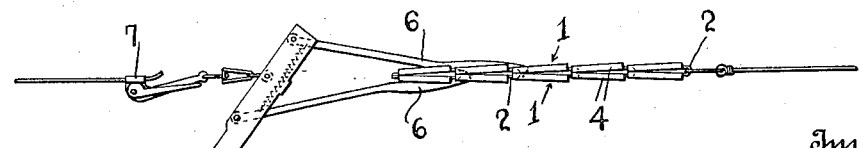
Witness
L. B. James
L. C. Wilcox
Inventor
W. A. Hager
By Victor J. Evans
Attorney

UNITED STATES PATENT OFFICE.

WILLIAM A. HAGER, OF TEXHOMA, OKLAHOMA.

CHAIN.

1,305,897. Specification of Letters Patent. Patented June 3, 1919.

Application filed January 25, 1918. Serial No. 213,765.

*To all whom it may concern:*

Be it known that I, WILLIAM A. HAGER, a citizen of the United States, residing at Texhoma, in the county of Texas and State of Oklahoma, have invented new and useful Improvements in Chains, of which the following is a specification.

This invention relates to chains especially adapted to be used for stretching wire fences, for pulling heavy vehicles out of ruts or depressions, and other rut work and it consists in the novel features hereinafter described and claimed.

An object of the invention is to provide a chain composed of links having outstanding flanges at their side edges which serve as strengthening means for the links and which also serve as guides for directing hooks or other implements into the openings of the links when the said hooks are employed for dragging or drawing the chain.

In the accompanying drawing:—

Figure 1 is a side elevation of a section of the chain illustrating a lever provided with hooks operatively engaging the links of the chain.

Fig. 2 is an end view of the chain with one of the links in section.

Fig. 3 is a perspective view of one of the links.

Fig. 4 is a plan view showing a stretcher applied to the chain.

The chain is composed of links which in turn are provided with side portions 1, the said portions converging toward each other from a return bend 2 which is provided at one end of the link. The side portions 1 are provided with elongated openings 3 and the return bend 2 of the link passes transversely through the openings 3 of the next adjacent link. This arrangement is observed throughout the length of the chain. The side portions 1 are provided at their upper and lower edges and along the length of the opening 3 with outstanding flanges 4. These flanges 4 terminate short of the return bend 2.

A chain so constructed possesses maximum strength and the links may be formed from sheet metal. When the chain is used for stretching the line wires of a fence a lever 5 is employed. The said lever 5 is provided with spring retained hooks 6 and the bill ends of the said hooks may be engaged through the openings 3 in the side portions 1 of the links and as the lever 5 is swung the said hooks will progress successively along the links thus drawing or pulling the chain and stretching or pulling the object which is connected with the chain. If desired the lever 5 may be provided with a clamp device 7 for attaching the same to the line wire of a fence. When the chain is used in the capacity stated one end thereof is anchored or secured to a post, tree or other fixed object.

From the foregoing description taken in connection with the accompanying drawing, it will be seen that a chain of simple structure is provided, and that the same possesses maximum strength and its links may also serve as means for guiding hooks through the openings to cause the said hooks to promptly engage in the same.

Having described the invention what is claimed is:—

A chain composed of links having side portions provided with openings and having outstanding flanges located at the edges of the side portions.

In testimony whereof I affix my signature.

WILLIAM A. HAGER.

Copies of this patent may be obtained for five cents each, by addressing the "Commissioner of Patents, Washington, D. C."